(12) United States Patent
Henderson et al.

(10) Patent No.: US 6,729,667 B2
(45) Date of Patent: May 4, 2004

(54) STRETCHER SUSPENSION LINKAGES

(75) Inventors: Robert James Henderson, Lower Hutt (NZ); John Kenneth Raine, Christchurch (NZ)

(73) Assignee: Howard Wright Limited, New Plymouth (NZ)

( * ) Notice: Subject to any disclaimer, the term of this patent is extended or adjusted under 35 U.S.C. 154(b) by 0 days.

(21) Appl. No.: 10/270,191

(22) Filed: Oct. 15, 2002

(65) Prior Publication Data
US 2003/0071472 A1 Apr. 17, 2003

(30) Foreign Application Priority Data
Oct. 16, 2001 (NZ) .................................................. 514833

(51) Int. Cl.[7] ............................ A47C 19/00; B62D 25/00
(52) U.S. Cl. ................................................ 296/20; 5/118
(58) Field of Search ...................... 296/20, 19, 190.02; 5/118, 611, 11

(56) References Cited

U.S. PATENT DOCUMENTS

| | | | | | |
|---|---|---|---|---|---|
| 3,760,436 | A | * | 9/1973 | Zach et al. | 5/118 |
| 4,078,269 | A | * | 3/1978 | Weipert | 5/611 |
| 4,144,601 | A | * | 3/1979 | Anderson et al. | 5/118 |
| 4,541,134 | A | * | 9/1985 | Black et al. | 5/118 |

FOREIGN PATENT DOCUMENTS

EP 0 190 782 * 8/1986 ................. 296/20

* cited by examiner

Primary Examiner—Joseph D. Pape
(74) Attorney, Agent, or Firm—Young & Thompson

(57) ABSTRACT

A linkage for a stretcher suspension. The linkage includes a stretcher receiving frame 17 and a base frame 23. A pair of arms 10 are pivotally fixed to bottom frame 23 and slidingly connected (12, 14) to frame 17. A pneumatic suspension unit 33 is located between the arms 10 and a first link 27 pivotally coupled between arms 10 and frame 17. A cross member 12 of the slide coupling is coupled to a sliding mount 25 of a second link 24 pivotally coupled to an arm 18 pivotally connected to the frame 17 and sliding coupled (21) to the base frame 23.

27 Claims, 12 Drawing Sheets

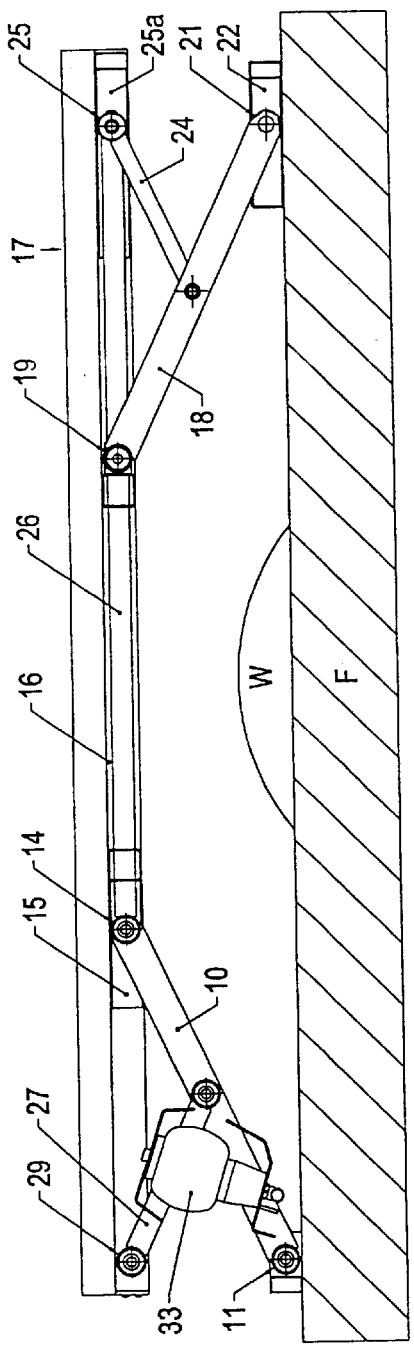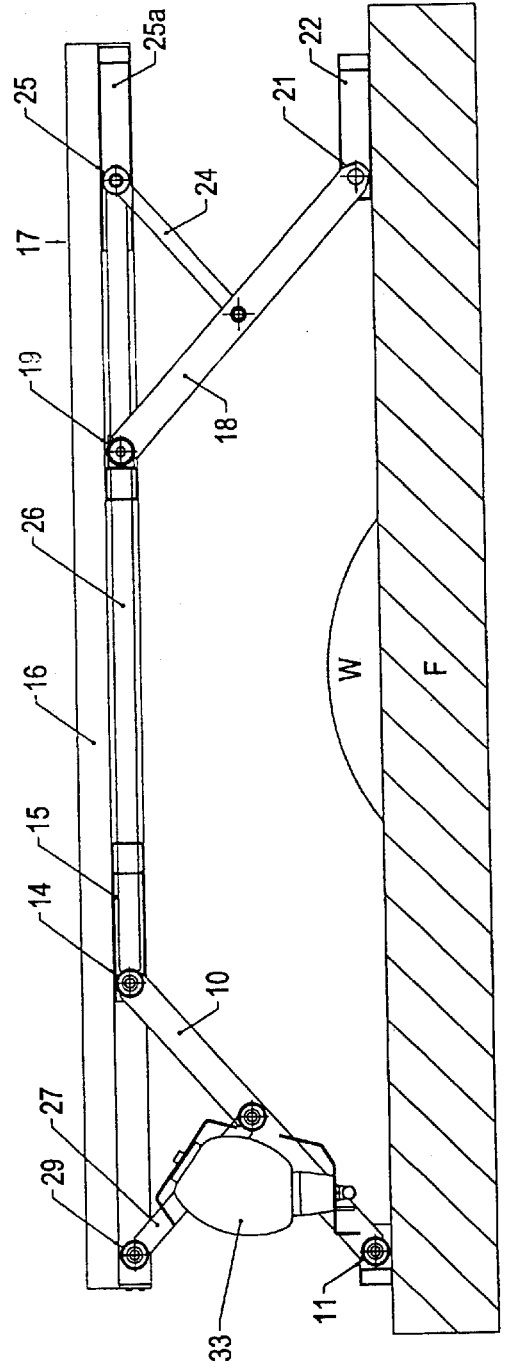

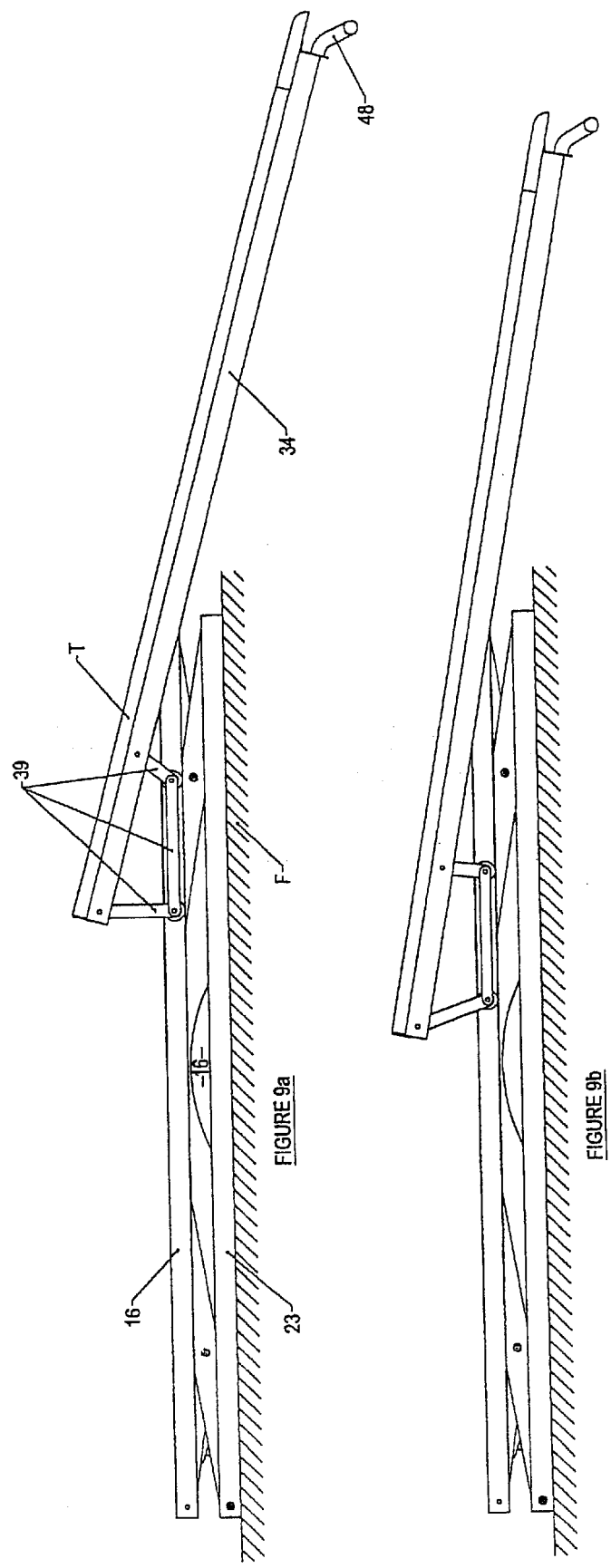

STRETCHER SUSPENSION LINKAGES

BACKGROUND TO THE INVENTION

This invention relates to stretcher suspension linkages.

The stretcher suspension linkages according to the present invention have particular application in the field of handling and supporting stretchers in, for example, ambulances but as will hereinafter become apparent can be used in other applications. For the purposes of disclosure of the stretcher suspension linkages reference will be primarily made to the linkages used in conjunction with an ambulance.

It is known to provide a stretcher suspension in an ambulance. The suspension not only retains and supports the stretcher but preferably provides isolation for stretcher-borne patients from ambulance floor vibration. A factor that must be taken into account with such suspensions is the different loadings which will arise from patients of differing weight. With known arrangements, either the suspension is not able to adapt to changes in load or is of a complex design in order to provide variation depending on load.

A further typical problem with stretcher suspensions in ambulances arises from the intrusion of the wheel arch into the space where stretchers are loaded. Consequently, it is not uncommon for an ambulance fitted with a stretcher suspension to only be able to carry one stretcher due to the need to position the suspension between the wheel arches.

A further requirement of stretcher suspension systems is to provide sufficient stiffness both laterally and in roll. Previous efforts to provide a suspension system which enables it to be fitted over an ambulance wheel arch so that two suspension/stretchers can be fitted in the ambulance (one against either side wall) have not been sufficiently stiff laterally and in roll.

SUMMARY OF THE INVENTION

An object of the present invention is thus to provide a linkage which is suitable for a stretcher suspension and which overcomes or goes some way to overcoming one or more of the disadvantages of known stretcher suspensions.

According to one broad aspect of the invention there is provided a linkage for a stretcher suspension, the linkage including link members arranged to permit a stretcher receiving member to move relative to a mounting base, the linkage including spring means, said base being arranged to be engageable at least in part about a protrusion in a surface with which the mounting base is mountable.

BRIEF DESCRIPTION OF THE DRAWINGS

In the following more detailed description of the invention, reference will be made to the accompanying drawings in which.

DESCRIPTION OF THE PREFERRED EMBODIMENTS

Figure 1:
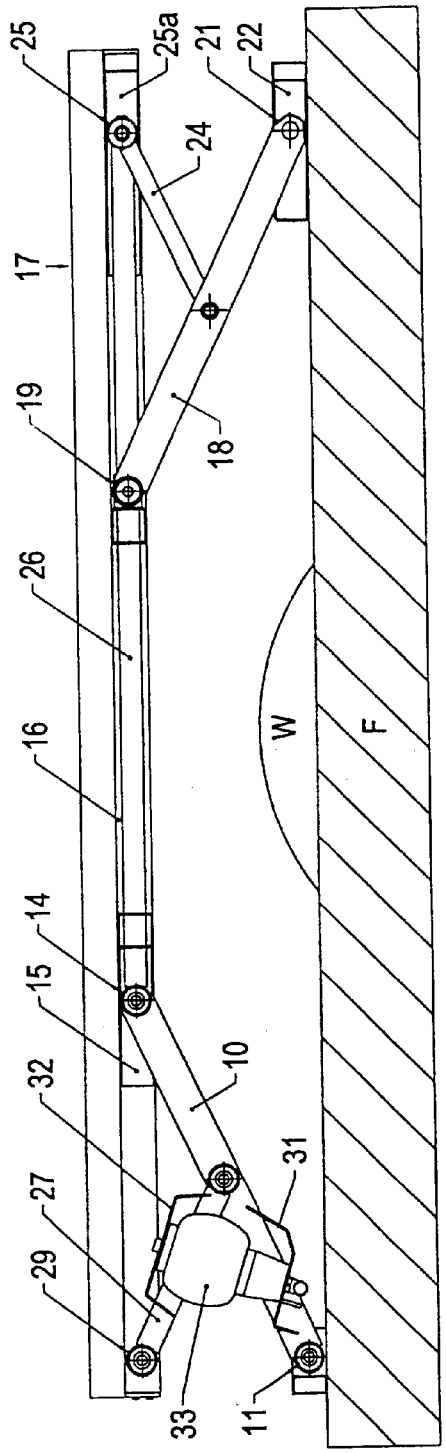
FIG. 1 is a largely schematic elevation view of a linkage according to the present invention used in a stretcher suspension system.
Figure 3:
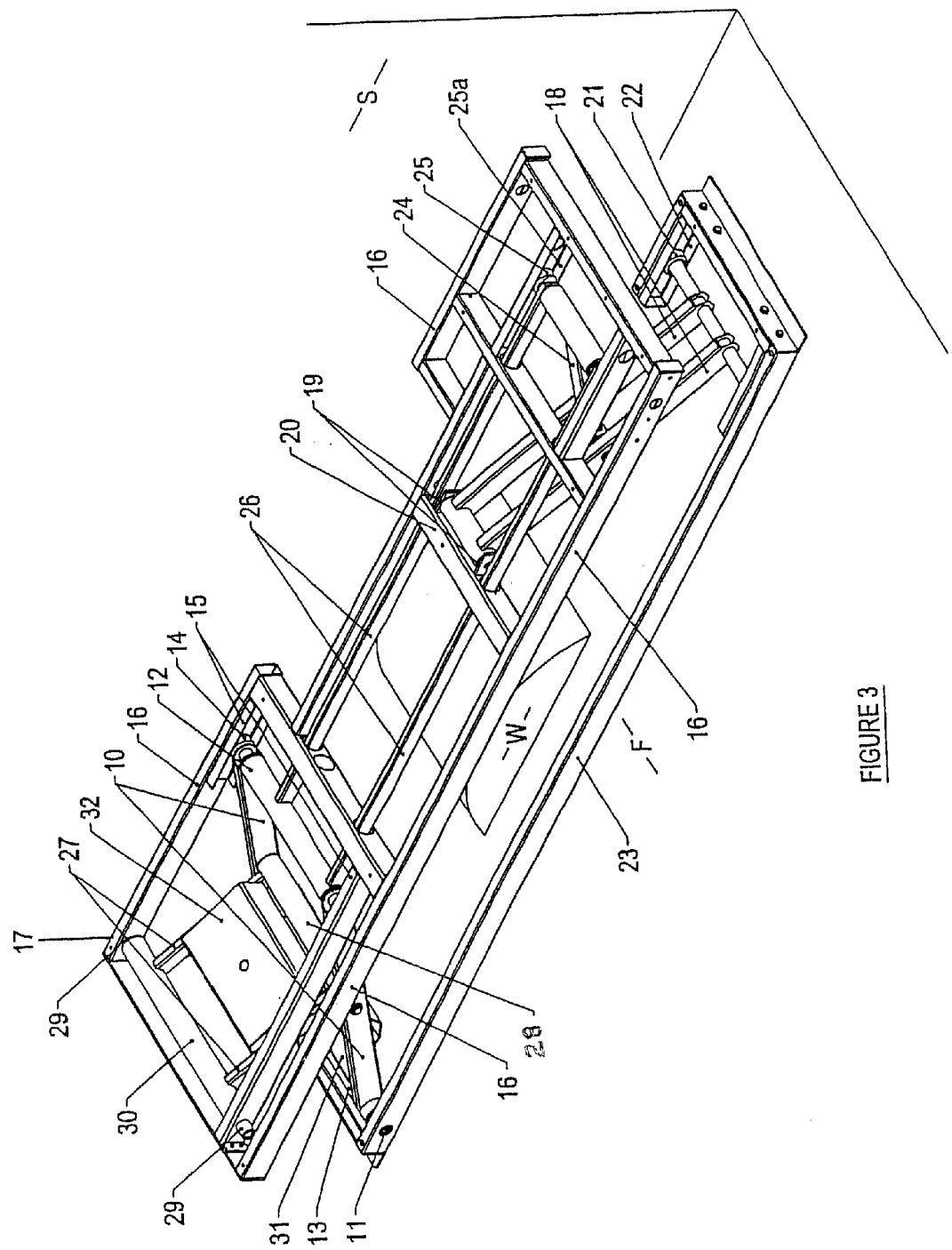
FIG. 3 is a three-dimensional schematic view of the linkage showing all members that make up the linkage.

Referring firstly to FIG. 1, the linkage which is useable for a stretcher suspension system comprises a number of arms which are mounted in pairs as can be seen, for example, from FIG. 3. A first main arm 10 is pivotally coupled to a fixed mounting 11. Pivot axles or shafts 12 and 13 extend between the arms 10 as can be seen in FIG. 3. At the ends of shaft 12 are located rollers 14 which are "captured" for sliding movement in tracks 15 mounted to the side members 16 of suspension top frame 17.

A pair of second main arms 18 which are located closely adjacent (see FIG. 3) are pivotally mounted at one end to an anchorage formed by flanges 19 mounted to a cross member 20 (FIG. 3) of top frame 17. The other ends of arms 18 are provided with one or more rollers 21 which are "captured" in tracks 22 mounted to the floor F of the ambulance.

As can be seen in FIG. 3, the anchorages to the floor F of the ambulance are preferably carried out by use of a suitable lower frame 23. This frame 23 is configured as shown in FIG. 3 such that the frame clears the wheel arch W of the ambulance, this wheel arch protruding into the floor area F. By being able to locate about the wheel arch W the stretcher suspension can be located adjacent the sidewall S (see FIG. 3) of the ambulance.

Pivotally mounted at one end between arms 18 is a further arm 24. This arm 24 is coupled at its other end to one or more rollers 25 which are captured in a track 25a mounted with the top suspension frame 17.

Transfer links 26 extend from shaft 12 to the axle on which the rollers 25 are mounted.

At the other end of the suspension yet further arms 27 are provided. These are pivotally coupled via an axle 28 between the first main arms 10. The other ends of the arms 27 are pivotally fixed to anchorages 29 located with the top suspension frame 17. Axle 30 extends therebetween and provides the pivotal movement of the arms 27 relative to anchorages 29 as per the same type of arrangement between arms 10 and anchorages 11.

Spanning between arms 10 and arms 27 are suspension mounts 31 and 32. A pneumatic suspension unit 33 (see FIG. 1) is mounted between these mounts 31 and 32.

Figure 2A:
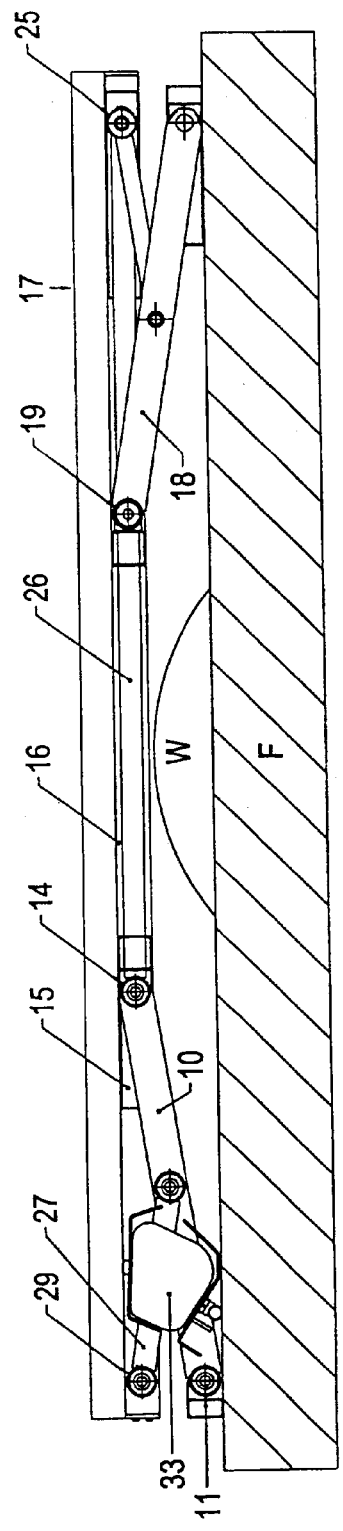
FIG. 2 is a further schematic elevation view showing the movement range of the linkage of FIG. 1.

To further describe the invention, reference will be made to FIG. 2 which shows the movement range of the linkage. FIG. 2b shows the suspension at its normal ride height. However, a downward force acting on the top frame 17 can cause the linkage to "collapse" ie move top frame 17 toward base frame 23 with the suspension unit 33 compressing (FIG. 2a). Controlled movement of the top suspension frame 17 toward the floor F or lower suspension frame 23 is achieved by the pivot mounting of the various arms and the ability of the rollers to move in their respective guides. As can be seen, top frame 17 remains horizontal.

An upward force acting on the upper frame 17 can cause the suspension to move to its maximum height as shown in FIG. 2(c) where the suspension unit 33 has extended and opposite movement of the rollers in their respective guides has occurred.

During normal suspension operation, movements of the ambulance floor would typically be small enough that the suspension would never reach its extremes of stroke (ie fully-collapsed or maximum-height positions). The suspension would only occupy the fully collapsed position when lowered for loading/unloading.

One or more suspension units 33 can be mounted between mounts 31 and 32 as required.

The suspension arrangement uses a pneumatic spring to provide isolation for stretcher-borne patients from ambulance floor vibration. Pneumatic springs provide a natural frequency and ride height that varies little with load (patient mass). This is contrary to conventional mechanical springs which have a fixed rate and cannot adapt to suit the weight of the load.

Figure 10:
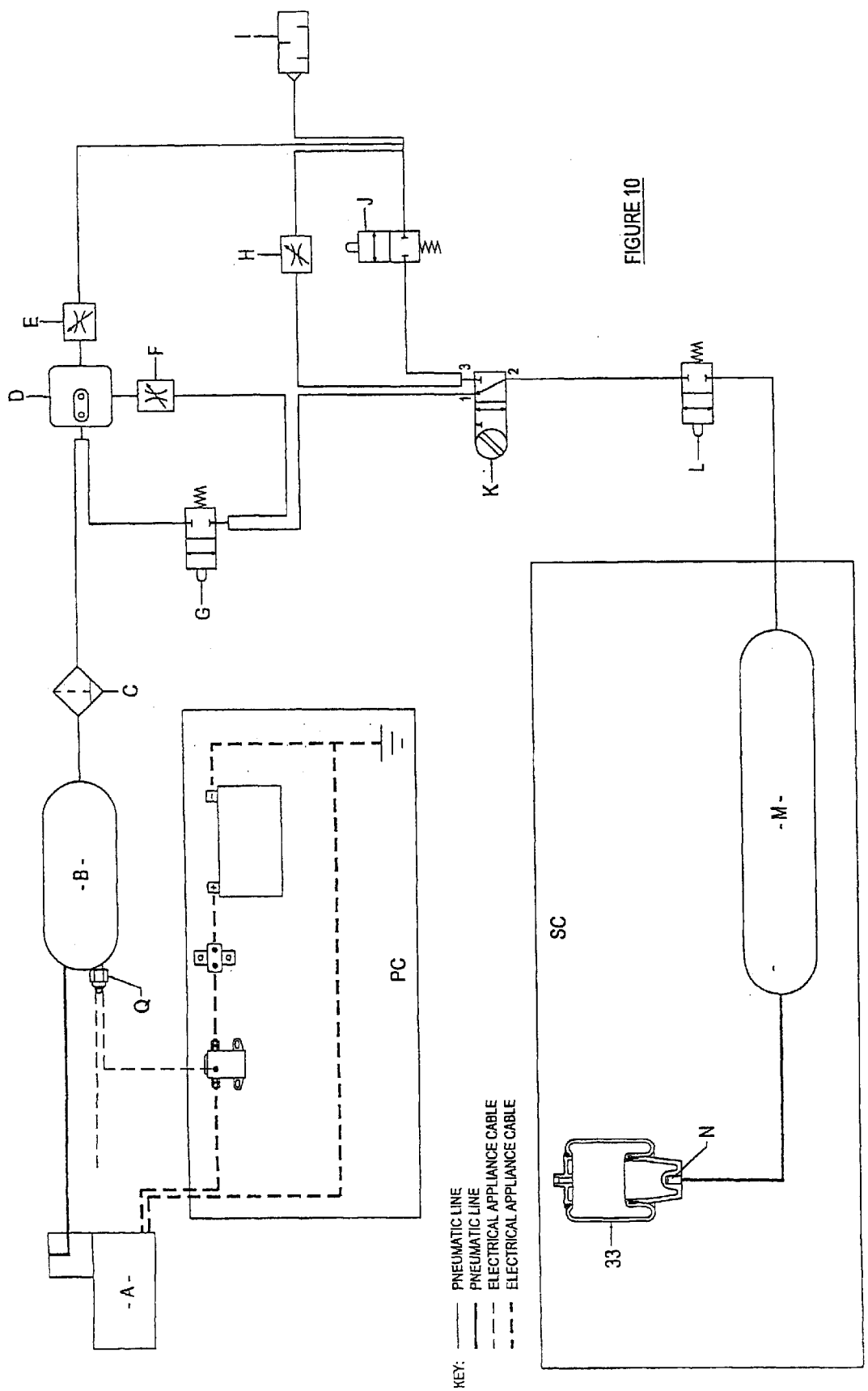
FIG. 10 is a pneumatic circuit layout of an operating system.
Figure 11:
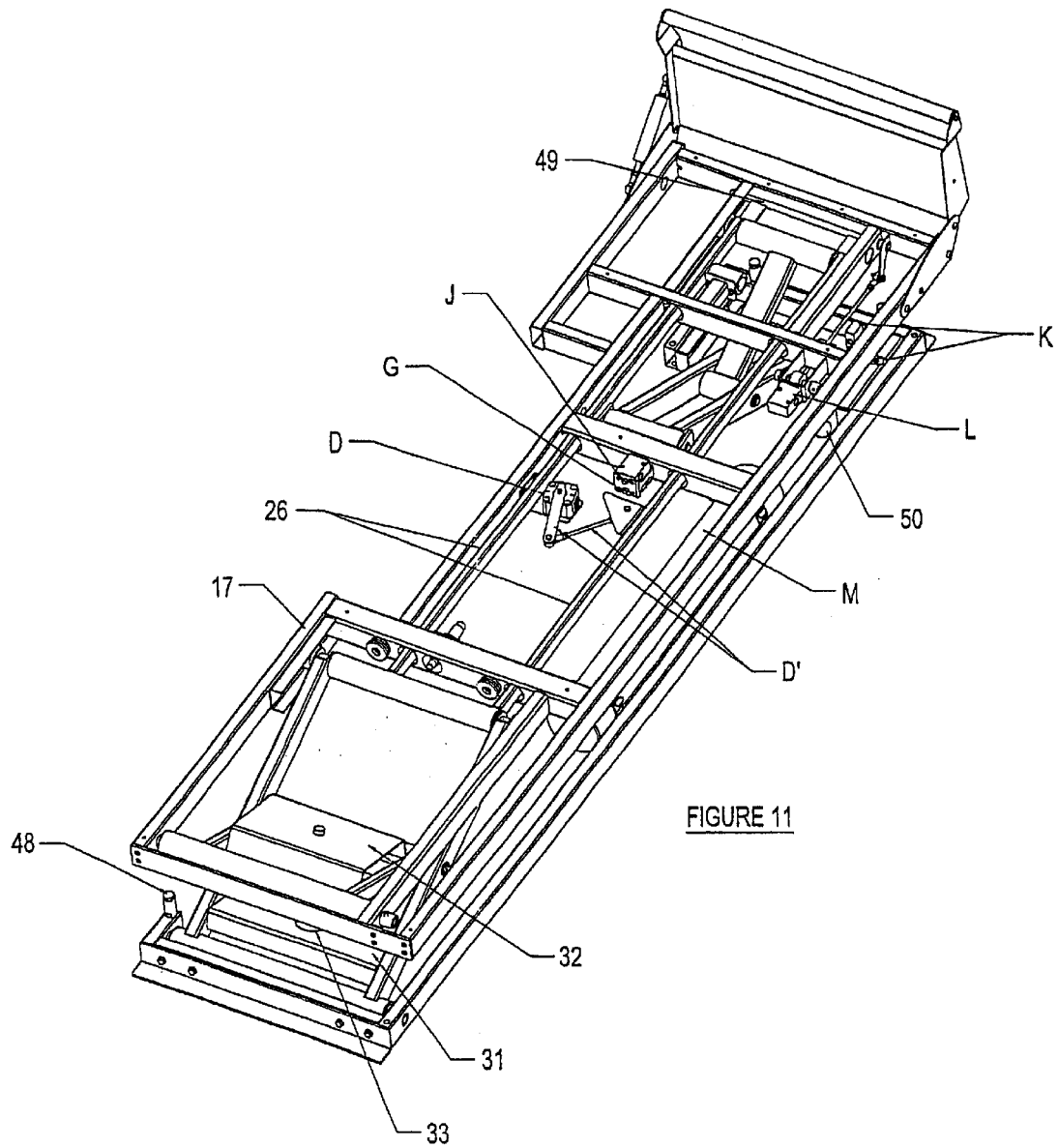
FIG. 11 is a perspective end view from above of the stretcher suspension illustrating parts of the operating system.

Referring now to FIGS. 10 and 11 there is shown a pneumatic system which provides vibration isolation control for the stretcher and patient. It also ensures efficient and effective use of air supplied by an air compressor.

The pneumatic system controls the raising and lowering of the upper platform to and from the ride height. The ride height is the design height for the suspension and is set at approximately half the total travel of the suspension (see FIG. 2b). The suspension automatically adjusts to the correct ride height regardless of patient mass up to a maximum total mass. Raising and lowering of the upper platform 17 is performed by valve K.

The pneumatic circuit (see FIG. 10) is fed by a compressor A. The compressor fills a receiver B to a suitable pressure e.g. 150 psi. Pressure in receiver B is controlled using a pressure switch Q.

A low natural frequency (e.g. 0.5 Hz) of the system is achieved through the use of an air spring 33 piped directly to an auxiliary tank M. The damping of the suspension is performed using an orifice plate N between the auxiliary tank M and the air spring 33. The stretcher suspension system thus uses air for both the energy storage (springing) and energy dissipation (damping) of the system.

Raising and lowering of the upper platform 17 is, as stated above, performed using switch K and is actuated by an attendant. Once the switch K is switched to the raised position, no further input from the attendant is required. The suspension will thus rise to the ride height (FIG. 2b) entirely by itself irrespective of patient mass or other associated equipment placed on or removed from the upper platform.

Height levelling is achieved using a height control valve D with the control arm $D^1$ linked to one of the horizontal transfer links 26. This height levelling valve D adds air to the lower air spring circuit SC if the upper platform 17 is below ride height and exhausts air from the circuit SC if the upper platform 17 is above ride height. This provides continual adjustment if any additional load is added to or removed from the upper platform.

The height control valve D is heavily regulated through flow control valves E and F to minimise the amount of additional air being added to or exhausted from the lower air spring circuit during normal suspension operation i.e. when suspension is raised to ride height and acting as a suspension.

A rapid raise valve G increases initial raising speed. This rapid raise valve bypasses the flow control valve F allowing air to be transferred directly from the receiver B to circuit SC. This rapid raise valve G is open for the first part (e.g. 20 mm) of vertical upward movement of upper platform 17 and is horizontally controlled through the linkage by the transfer link 26. Because the rapid raise control is directly linked to the raising of the upper platform, the amount of air it supplies to circuit SC is proportional to the rising rate of the upper platform and hence the mass of the patient.

Lowering is initiated by switching switch K to the lowering position. Switch K in the lowering position isolates the height control valve D and rapid raise valve G and exhausts air through a speed control valve H. This speed control valve H directly controls the descent rate at which the upper platform 17 is lowered.

A rapid emptying valve J is used to quick exhaust the remaining air in the auxiliary tank M when the suspension is lowered. The rapid emptying valve J is open for the last part (e.g. 20 mm) of upper platform 17 lowering (to the rubber stops 48—FIG. 11) and is horizontally controlled through the linkage by the transfer link 26. The rapid emptying valve J acts as a safety device to prevent the stretcher rising rapidly should a patient climb off the stretcher immediately after lowering while there is still sufficient pressure in the lower air spring circuit SC.

A safety lock L is fitted to isolate the lower air spring circuit SC from the height control system. This valve L is actuated manually by an attendant (via lever 50) and operates simultaneously a mechanical lock 49 which locks the suspension at ride height.

The exhaust I is situated outside the ambulance to minimise suspension noise within the ambulance cabin.

Mechanical pneumatic valves could be substituted for solenoid equivalents with the height levelling being controlled electronically.

The suspension unit is preferably bolted permanently to the ambulance floor via the base frame 23. However, the base frame is so configured as shown in FIG. 3 that the suspension linkage can be mounted over the wheel arch W of the ambulance. This permits two suspensions/stretchers to be fitted in an ambulance, one against either sidewall.

The top frame 17 is fully supported across its width. The linkage thus offers good stiffness characteristics both laterally and in roll. By the top frame 17 being fully supported over its width and able to sit centrally over the linkage without overhang, this stiffness characteristic can be achieved.

The linkage is open to modification as will be appreciated by those skilled in the art. For example, a full-width linkage could be used at both ends of the suspension. Furthermore, one or a greater number of transfer links 26 could be used. A further variation could be swapping the rollers 21, 25 and 14 with the anchorages 19, 29 and 11 and moving the coupling links 26 from between rollers 14 and 25 to between the rollers which would be positioned at anchorages 19 and 29.

While it is preferred to use a pneumatic spring, other types of spring such as hydro-pneumatic, elastomer or mechanical (helical, coil, leaf, etc) could be used. Also, the mounting positions for the springs could be varied including between any of the suspension links, between the top-frame and base frame, between the top frame and any of the links and between the base frame and any of the links.

Alteration of the linkage could include tilt for Trendelenburg or pitch isolation e.g. by having one of the top frame pivots moveable and using a telescopic transfer link 26.

Making the transfer link 26 telescopic will allow the upper platform 17 to be tilted through an angle. The telescoping action of the transfer link 26 could be achieved by using a push pull pin in a series of holes to allow the length of the transfer link 26 to be altered. Alternative methods of varying the length of the transfer link 26 are through the use of a pneumatic, hydraulic or electric actuator.

The suspension can also be used in applications other than a road ambulance. For example, the characteristic of the suspension being able to isolate stretcher-borne patients from vehicle/road vibration could be useful for the isolation from vibration of seats in heavy vehicles, in hospital beds, trolleys and stretchers, isolation of bunks/beds in moving vehicles and transportation of fragile goods as well as explosives. It will also be appreciated by those skilled in the art that the suspension system could also equally be used for transport by air such as air ambulances.

Modern (so-called) "crash" stretchers have collapsible undercarriages. During loading onto an ambulance the undercarriage folds up beneath the stretcher. The stretcher can then be rolled forward onto the ambulance floor and clamped in position.

In a situation where the ambulance is fitted with a stretcher suspension, the stretcher is generally received on and carried by a tray. The tray pulls out from over the suspension and back at an angle to form a ramp onto which the stretcher is rolled. A variety of known mechanisms are used to provide the appropriate tray motion most of which are based on the use of angled tracks. These designs can be both bulky and unsightly.

Figure 4:
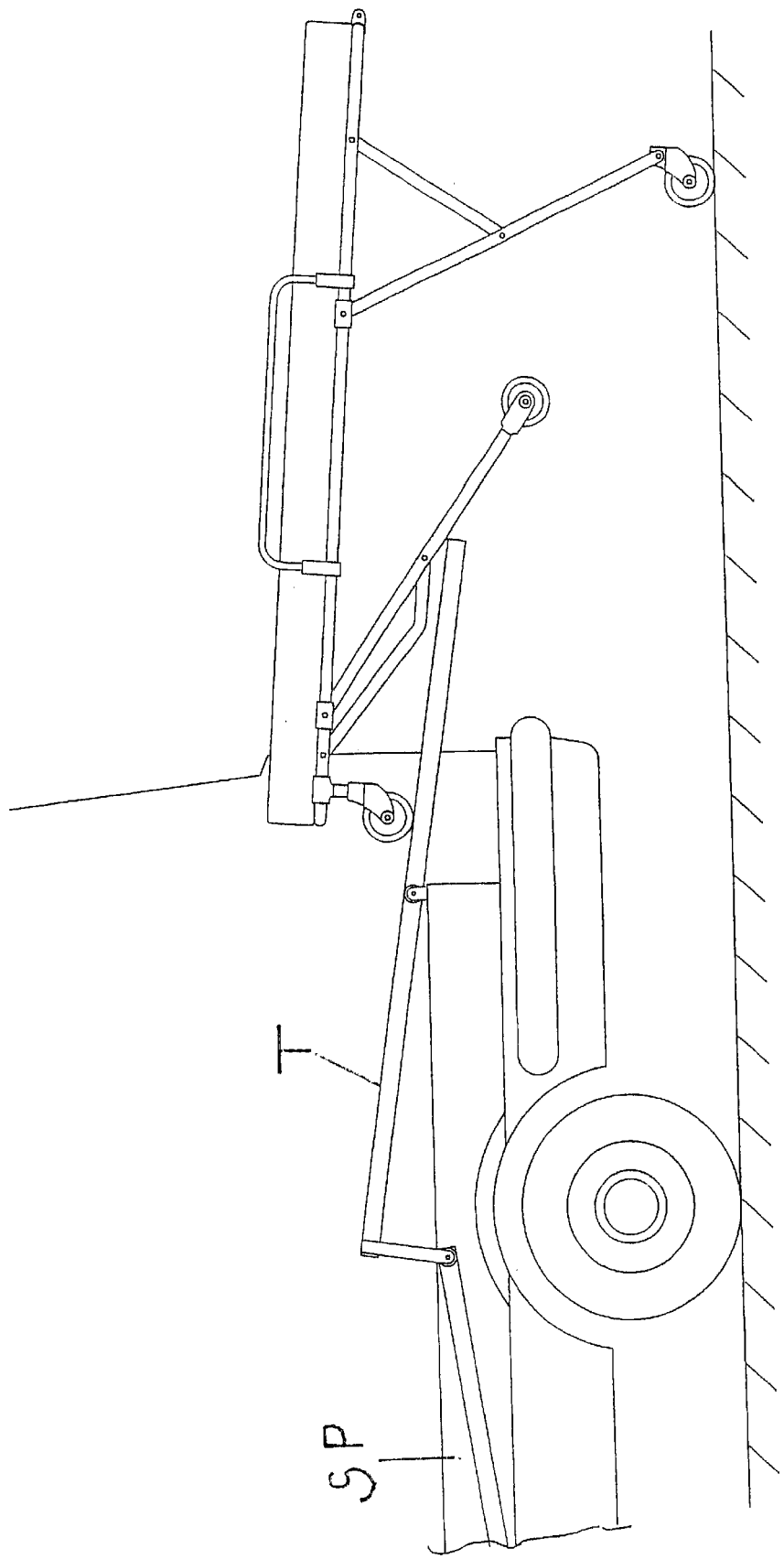
FIGS. 4–6 are illustrations of a known means of loading a crash stretcher onto a stretcher suspension of an ambulance using a known loading system.
Figure 5:
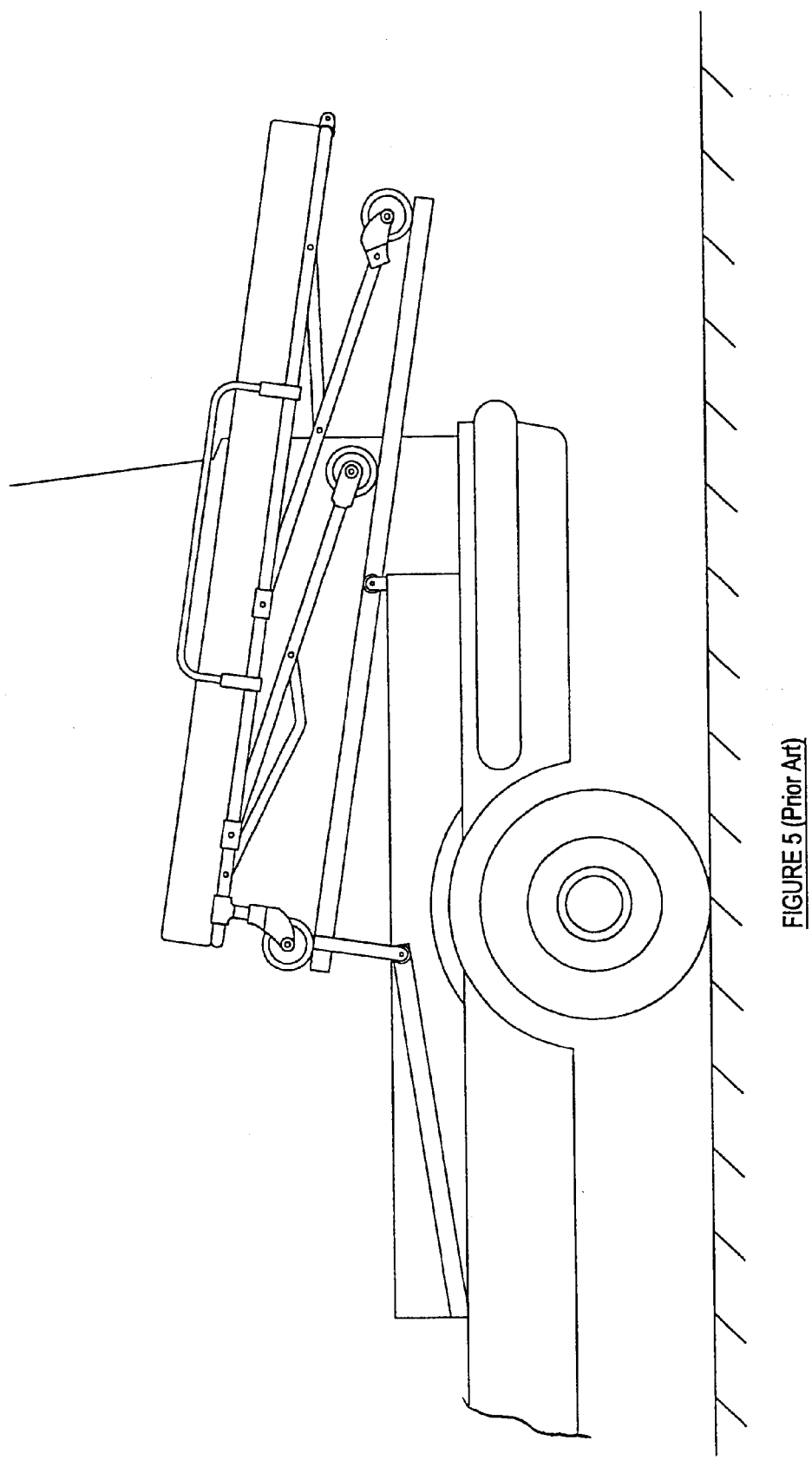
Figure 6:
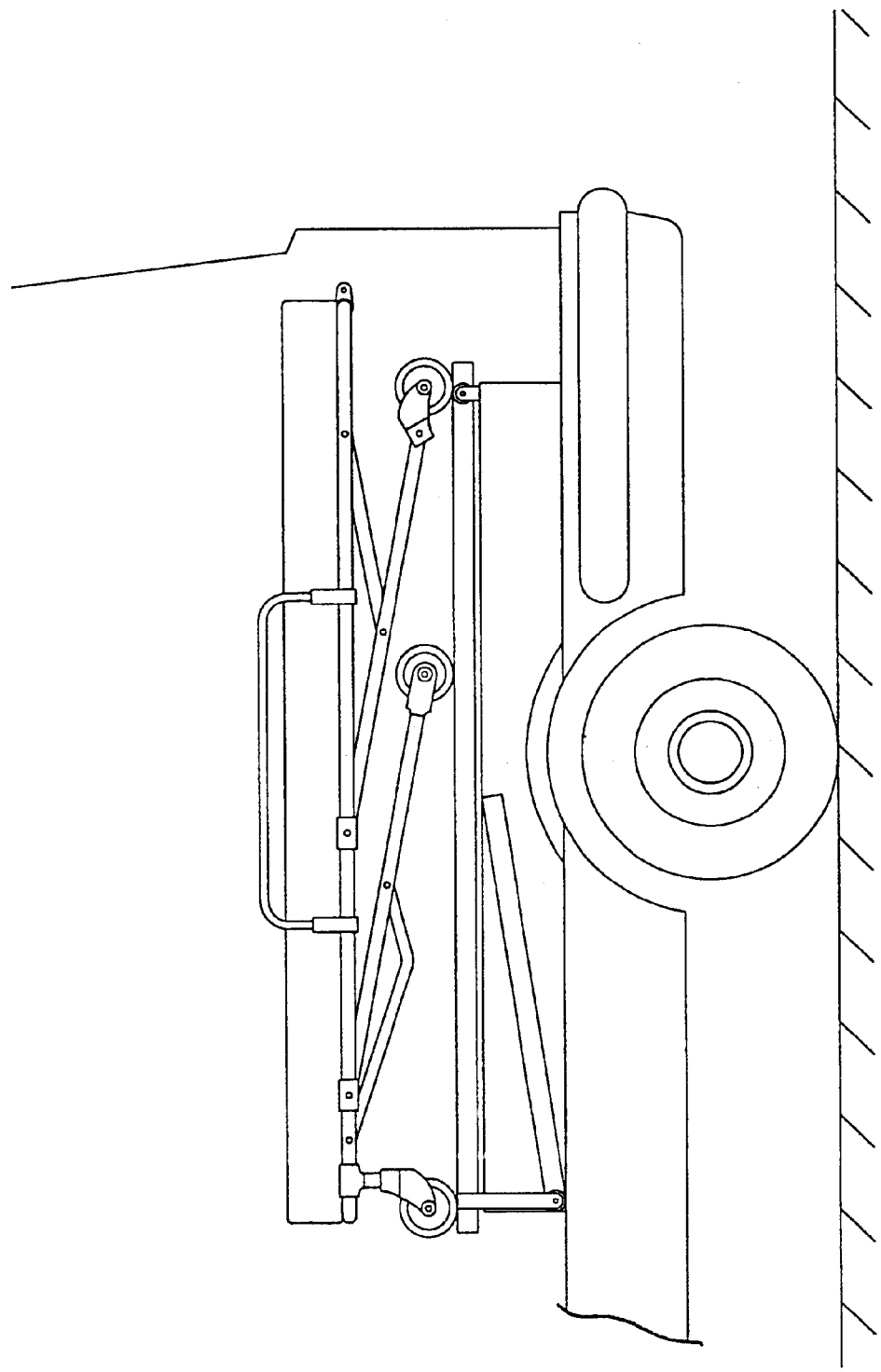

Referring to FIGS. 4–6, there is by way of background shown a "crash" stretcher of a known type during various stages of being loaded onto a stretcher tray T which is associated with a stretcher suspension arrangement SP in an ambulance to facilitate loading of the stretcher into the ambulance.

Figure 7:
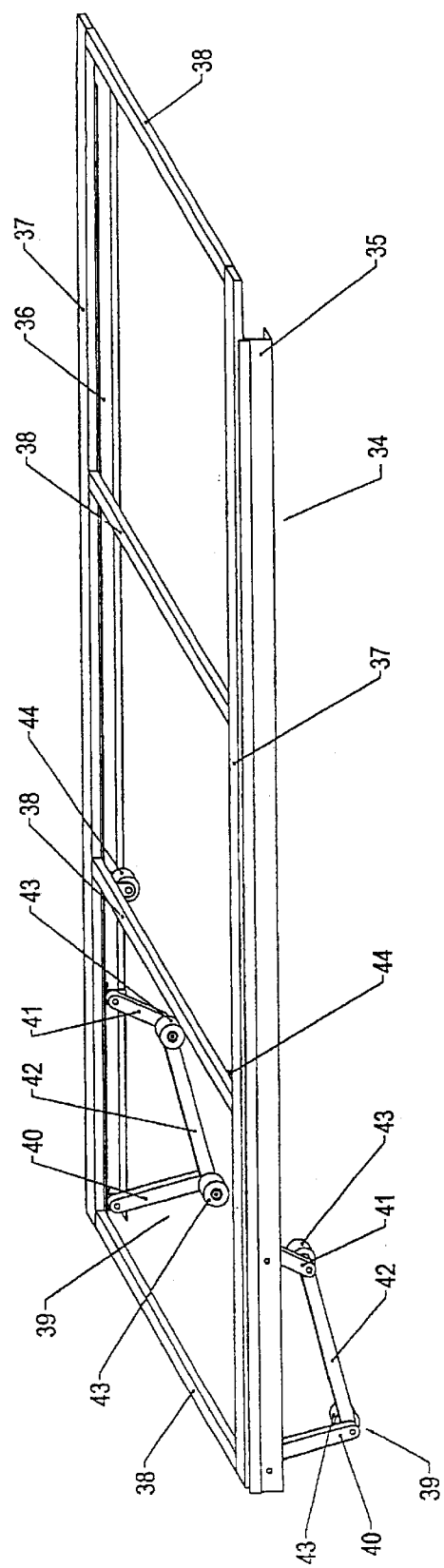
FIG. 7 is a three-dimensional illustration of a linkage and chassis according to the invention for use in a stretcher loading system.

FIG. 7 provides an illustration of a linkage which we have developed to provide a simple yet effective means of loading a "crash" stretcher onto a stretcher suspension of the type previously described.

The linkage includes a chassis 34 which has a pair of longitudinal opposing channel-shaped tracks 35. The chassis 34 can be of any suitable rigid structure and in the illustrated arrangement consists of side members 37 and a number of cross members 38. The frame formed by side members 37 and cross members 38 preferably protrude beyond one of a pair of opposed ends of the tracks 35 as can be seen at the right hand side of FIG. 7. This frame can form or support tray T.

At the other end of the chassis 34 a pair of four bar linkages 39 are provided. One "bar" of the linkage is preferably formed by a portion of the track 35 by pivotally mounting the long and short bars 40 and 41 directly thereto. The other ends of these bars 40 and 41 are pivotally coupled to a third bar 42. At the pivot couplings of bar 42 to the bars 40 and 41 rollers 43 are rotatably mounted.

The cross member 38 adjacent to the shorter bar 41 of the four bar linkage 39 is provided with a pair of rollers 44.

Figure 8:
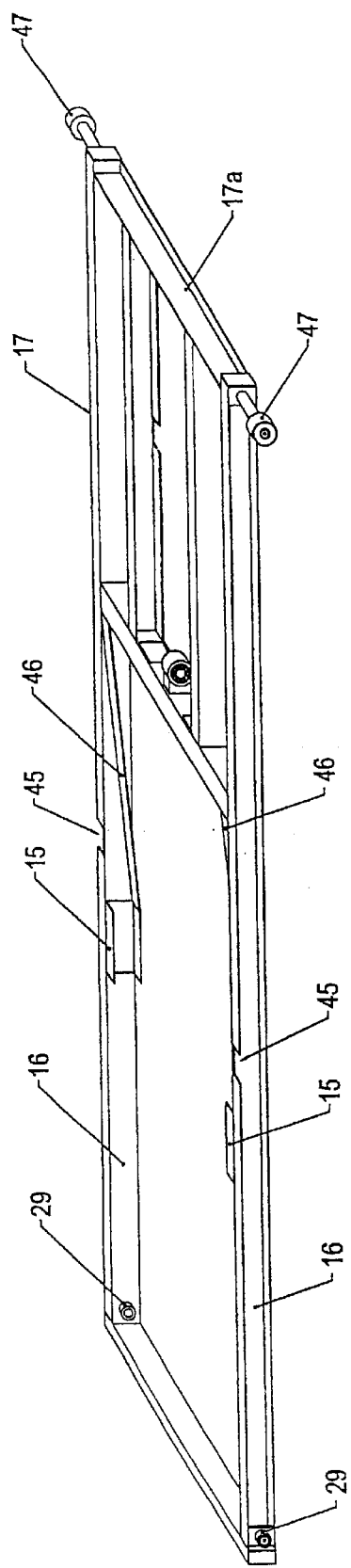
FIG. 8 is a three-dimensional view of a stretcher suspension top frame useable with the linkage of FIG. 7.

Referring now to FIG. 8, there is shown the top suspension frame 17 of the stretcher suspension arrangement previously described. The side members 16 of frame 17 are preferably in the form of parallel outwardly directed channels which provide a track for rollers 43. A cut-out 45 is provided at a suitable location to enable the rollers 43 to move into the track 16 when the chassis 34 is mounted to the top frame 17.

A ramp 46 is associated with each side member 16. This ramp is engaged by rollers 44 of the chassis 34 as hereafter described.

Finally, the end member 17a of top frame 17 is provided with a pair of rollers 47 which engage in the opposed tracks 35.

FIG. 9(a) shows the chassis 34 mounted with the top frame 17 of the stretcher suspension and in its extended position to receive a collapsible crash stretcher. As can be seen in a preferred form of the invention the distal end of the chassis 34 carries a handle 48 which enables an operator to pull the chassis 34 from its position on the stretcher suspension to the loading position of FIG. 9(a).

Figure 9C:
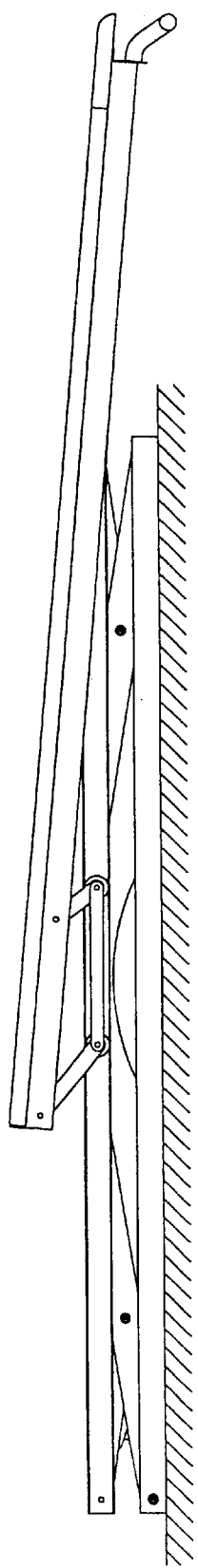
FIG. 9 is a series of illustrations showing the linkage in use for loading a stretcher onto a stretcher suspension arrangement of the type shown in preceding drawings FIGS. 1–3.
Figure 9D:
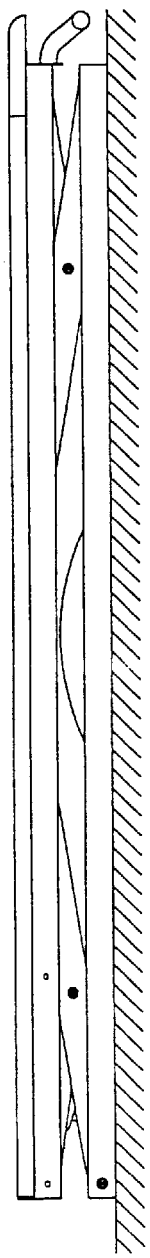

As the crash stretcher moves onto the tray T in a known manner, the chassis 34 is caused to move forward and onto its final position on the stretcher suspension as shown in FIG. 10(d). This movement is in a controlled manner as a consequence of rollers 43 moving along tracks 16, rollers 44 moving on ramps 46 and rollers 47 moving within the channel 35 of the chassis 34. This forward movement results in the stretcher tray moving from an angle of, say, 15° when fully extended (as shown in FIG. 9(a)) through, say, 10° of FIG. 9(b) and then 5° of FIG. 9(c) to end up in its fully horizontal position as shown FIG. 9(d) which corresponds to the fully loaded position.

The rollers 44 engage with ramps 46 as previously described but are only engaged for the initial 5° of tray movement from its rest or stowed position. As the tray is pulled further back to its loading position, these rollers disengage the ramps 46 and the loading linkage operates on the four bar linkage and the rollers 47 moving in channels 35. The ramps 46 serve two principal functions. Firstly, they relieve the linkage of any load for the first 5° of tray movement (the forces on the loading system being highest when the tray approaches its fully-in position) and, secondly, initiate upward movement of the tray as it is pulled back (in the absence of ramps 46 the tray would simply slide straight back without tilting).

The loading system is of a simple design making it easy to clean and safer for ambulance occupants as it does not include protruding/exposed parts that could cause injury.

The system is also not bulky and does not encroach down into the area used by the stretcher suspension.

Once again, the stretcher suspension loading system is open to modification as will be apparent to those skilled in the art. For example, buffers/dampers or end stops could be provided to reduce impact at the ends of the tray stroke. Another modification is the provision of springs (eg pneumatic or mechanical) to reduce the force required to push the loaded tray forward.

Other variations include the use of a single centrally mounted ramp, a single centrally mounted four bar link and set of tracks, curved rather than straight ramps and actuators for operating the system.

While the loading arrangement has particular application for crash stretches it will be apparent to those skilled in the art that there are numerous other uses including loading systems for boat trailers, tilting system for retractable covers and other loading/tilting mechanisms.

What is claimed is:

1. A stretcher suspension linkage, comprising link members arranged to permit a stretcher receiving member to move relative to a mounting base, and spring means, said mounting base being arranged to be engageable at least in part about a wheel arch protrusion in a floor of a vehicle with which floor the mounting base is mountable, and the link members including a first link element coupled by a fixed pivot to one of the mounting base or stretcher receiving member and coupled by a sliding pivot to the other of the stretcher receiving member or base, a second link coupled in a reverse manner by fixed and sliding pivots to the base and stretcher receiving member, and a third link pivotally coupled between the first or second link and the stretcher receiving member.

2. The linkage as claimed in claim 1 wherein the spring means is a pneumatic spring.

3. The linkage as claimed in claim 1 wherein the spring means is mounted between the third link and the first or second link.

4. The linkage as claimed in claim 3 further including a fourth link pivotally coupled to the other of the first or second links of which the third link is not attached and further coupled by a sliding pivot to the stretcher receiving member.

5. The linkage as claimed in claim 4 further including at least one transfer link pivotally coupled to the part of the fourth link which is coupled by said sliding pivot to the stretcher receiving member, the transfer link extending longitudinally of the stretcher receiving member to be pivotally coupled to the sliding pivot of the first or second link coupled to the stretcher receiving member.

6. The linkage as claimed in claim 1 wherein the stretcher receiving member is a frame.

7. The linkage as claimed in claim 1 wherein the base includes an open cut away portion which opens to a side portion of the base, said protrusion being locatable within the open area of the cut away portion.

8. The linkage as claimed in claim 1 further including a pneumatic system to provide vibration isolation control of the stretcher receiving member.

9. The linkage as claimed in claim 8 wherein the pneumatic system includes a compressed air source coupled to a pneumatic spring which includes an auxiliary tank connected to the pneumatic spring via an orifice plate.

10. The linkage as claimed in claim 8 wherein the pneumatic system includes height control valve means coupling the compressed air source to the pneumatic spring circuit and exhaust means coupled to the pneumatic spring circuit.

11. The linkage as claimed in claim 8 wherein the pneumatic system includes a control valve to control raising and lowering of the stretcher receiving member to and from a ride height.

12. The linkage as claimed in claim 9 further including a rapid rise valve means and a rapid exhaust valve means.

13. The linkage as claimed in claim 10 further including a lock mechanism to isolate the pneumatic spring circuit from said height control valve means.

14. A stretcher suspension linkage, comprising link members arranged to permit a stretcher receiving member to move relative to a mounting base, and spring means, said mounting base being arranged to be engageable at least in part about a wheel arch protrusion in a floor of a vehicle with which floor the mounting base is mountable, and the link members including a first link frame coupled to the base by a fixed pivot and coupled to the stretcher receiving member by a sliding pivot arranged to slide longitudinally of the stretcher receiving member, and a second link frame pivotally coupled to the first link frame, said second link frame being further pivotally coupled to the stretcher receiving member at a position substantially above the fixed pivot coupling of the first link frame to the mounting base, said spring means being mounted between the first and second link frames.

15. The linkage as claimed in claim 14 wherein the spring means is a pneumatic spring unit.

16. The linkage as claimed in claim 14 wherein the link members further include a third link frame oppositely disposed to the first link frame and coupled by a fixed pivot to the stretcher receiving member and coupled by a sliding pivot to the base, a further link frame being pivotally coupled to the third link frame and coupled to the stretcher receiving member by a sliding pivot.

17. The linkage as claimed in claim 16 further including at least one transfer link extending between and coupled to the first and fourth link frames.

18. A stretcher suspension device for a vehicle, comprising a mounting base, a stretcher receiving member and a linkage that includes spring means, the linkage having link members arranged to permit the stretcher receiving member to move relative to the mounting base, said mounting base being arranged to be engageable at least in part about a wheel arch protrusion in a floor of the vehicle with which floor the mounting base is mountable.

19. The stretcher suspension device as claimed in claim 18, wherein the link members include a first link element coupled by a fixed pivot to one of the mounting base or stretcher receiving member and coupled by a sliding pivot to the other of the stretcher receiving member or base and a second link coupled in a reverse manner by fixed and sliding pivots to the mounting base and stretcher receiving member.

20. The stretcher suspension device as claimed in claim 19, further including a third link pivotally coupled between the first or second link and the stretcher receiving member.

21. The stretcher suspension device as claimed in claim 20, wherein the spring means is a pneumatic spring and is mounted between the third link and the first or second link.

22. The stretcher suspension device as claimed in claim 20, further including a fourth link pivotally coupled to the other of the first or second links of which the third link is not attached and further coupled to a sliding pivot to the stretcher receiving member.

23. The stretcher suspension device as claimed in claim 21, further including at least one transfer link pivotally coupled to the part of the fourth link which is coupled by said sliding pivot to the stretcher receiving member, the transfer link extending longitudinally of the stretcher receiving member to be pivotally coupled to the sliding pivot of the first or second link coupled to the stretcher receiving member.

24. The stretcher suspension device as claimed in claim 18, wherein the stretcher receiving member is a frame and the mounting base includes an open cut away portion which opens to a side portion of the base said wheel arch protrusion being locatable within the open area of the cut away portion.

25. The stretcher suspension device as claimed in claim 18, further including a pneumatic system to provide vibration isolation control of the stretcher receiving member, said pneumatic system including a compressed air source coupled to a pneumatic spring which forms said spring means, the pneumatic system further including an auxiliary tank connected to the pneumatic spring via an orifice plate.

26. The stretcher suspension device as claimed in claim 25, wherein the pneumatic system includes height control valve means coupling the compressed air source to the pneumatic spring circuit and exhaust means coupled to the pneumatic spring circuit, and further including a lock mechanism to isolate the pneumatic spring circuit from said height control valve means.

27. The stretcher suspension device as claimed in claim 26, further including a rapid raise valve means and a rapid exhaust valve means.

\* \* \* \* \*